United States Patent
Kageyama

(10) Patent No.: US 12,104,944 B2
(45) Date of Patent: Oct. 1, 2024

(54) COMBINATION WEIGHING DEVICE

(71) Applicant: Ishida Co., Ltd., Kyoto (JP)

(72) Inventor: Toshiharu Kageyama, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 383 days.

(21) Appl. No.: 17/628,492

(22) PCT Filed: May 29, 2020

(86) PCT No.: PCT/JP2020/021382
§ 371 (c)(1),
(2) Date: Jan. 19, 2022

(87) PCT Pub. No.: WO2021/029122
PCT Pub. Date: Feb. 18, 2021

(65) Prior Publication Data
US 2022/0276087 A1 Sep. 1, 2022

(30) Foreign Application Priority Data
Aug. 9, 2019 (JP) ................................. 2019-147951

(51) Int. Cl.
*G01G 19/387* (2006.01)
(52) U.S. Cl.
CPC ................. *G01G 19/387* (2013.01)
(58) Field of Classification Search
CPC ......................... G01G 19/387; G01G 19/393
(Continued)

(56) References Cited

U.S. PATENT DOCUMENTS 4,418,771 A * 12/1983 Henry .................... G01G 19/34
177/1
4,844,190 A * 7/1989 Mikami ............... G01G 19/393
177/25.18
(Continued)

FOREIGN PATENT DOCUMENTS

JP 60196626 * 10/1985
JP S60-196626 A 10/1985
(Continued)

OTHER PUBLICATIONS

The extended European search report issued by the European Patent Office on Jan. 2, 2023, which corresponds to European Patent Application No. 20851675.7-1001 and is related to U.S. Appl. No. 17/628,492.

(Continued)

*Primary Examiner* — Jacques M Saint Surin
(74) *Attorney, Agent, or Firm* — Studebaker & Brackett PC

(57) ABSTRACT

A combination weighing apparatus includes a dispersion table configured to convey an article from a received center to an outer side, the article being supplied from an outside, a plurality of conveying feeders disposed outside the dispersion table, the plurality of conveying feeders being configured to further convey the article conveyed from the dispersion table, a detector configured to detect a loading status information of the article in each of the plurality of conveying feeders, and a controller configured to receive a detection result of the detector. The controller is configured to generate a vector information based on the loading status information detected by the detector and a position information of the plurality of conveying feeders with respect to a center of the dispersion table, and generate a biased center (Continued)

of the article on the dispersion table obtained based on the vector information.

9 Claims, 11 Drawing Sheets

(58) Field of Classification Search
USPC .......................................................... 177/17
See application file for complete search history.

(56) References Cited

U.S. PATENT DOCUMENTS

| | | | | |
|---|---|---|---|---|
| 4,967,856 | A * | 11/1990 | Kawanishi | G01G 13/244 |
| | | | | 177/1 |
| 5,765,335 | A | 6/1998 | Simionato | |
| 7,855,343 | B2 * | 12/2010 | Nakagawa | B65G 69/16 |
| | | | | 198/530 |
| 10,670,449 | B2 * | 6/2020 | Otoshi | G01G 19/393 |
| 2017/0305679 | A1 | 10/2017 | Kageyama et al. | |
| 2023/0296423 | A1 * | 9/2023 | Ichihashi | B65G 65/005 |
| | | | | 177/59 |

FOREIGN PATENT DOCUMENTS

| | | |
|---|---|---|
| JP | H07-77454 A | 3/1995 |
| JP | 2002-062185 A | 2/2002 |
| JP | 3325897 B2 | 9/2002 |
| JP | 2005-055187 A | 3/2005 |
| JP | 4391194 B2 | 12/2009 |
| JP | 2016-148557 A | 8/2016 |
| WO | 95/31702 A1 | 11/1995 |
| WO | 2004/042335 A1 | 5/2004 |
| WO | 2016/043324 A1 | 3/2016 |

OTHER PUBLICATIONS

Notification of Transmittal of Translation of the International Preliminary Report on Patentability and Translation of Written Opinion of the International Searching Authority; PCT/JP2020/021382; mailed on Feb. 17, 2022.

International Search Report issued in PCT/JP2020/021382; mailed Aug. 25, 2020.

* cited by examiner (b)

(b)

(b)

COMBINATION WEIGHING DEVICE

TECHNICAL FIELD

The present disclosure relates to a combination weighing apparatus.

BACKGROUND ART

The combination weighing apparatus includes, for example, a plurality of conveying units that convey articles, a plurality of hoppers that temporarily store articles and are provided corresponding to the plurality of conveying units, a weighing unit that outputs a weighing value according to the mass of articles stored in each of the hoppers, and a controller that selects a combination of weighing values from the plurality of weighing values output by the weighing unit such that a total value is a target weighing value and discharges articles to hoppers corresponding to the combination.

For example, Patent Document 1 discloses a combination weighing apparatus including a feeding means (conveying unit) for feeding objects to be weighed (articles), an imaging means for imaging the objects to be weighed on the feeding means, and a control means for controlling the amount of objects to be weighed carried out by the feeding means based on an imaging signal from the imaging means.

CITATION LIST

Patent Literature

[Patent Document 1] International Publication No. WO 95/31702

SUMMARY OF INVENTION

Technical Problem

In the above Patent Document 1, it is possible to confirm the region where the objects to be weighed stay on the sending means by using the imaging signal obtained from the imaging means. However, it is not possible to obtain how much the objects to be weighed stay in the region. For this reason, for example, it is not possible to generate a deviation of the objects to be weighed which are supplied to the respective feeding means. For example, by 3D restoration using a 3D camera or a large number of imaging means, it is possible to estimate the degree of the objects to be weighed staying on the feeding means. However, such estimation is likely to be complicated because a large number of imaging data are processed. In addition, since it can be said that the reliability of the estimation is low as compared with the processing load, it is likely to be difficult to put the estimation into practical use.

An object of one aspect of the present disclosure is to provide a combination weighing apparatus capable of easily estimating a deviation degree of articles supplied to a plurality of conveying feeders through a dispersion table.

Solution to Problem

A combination weighing apparatus according to an aspect of the present disclosure includes a dispersion table configured to convey an article supplied from a received center to an outer side, the article being supplied from an outside, a plurality of conveying feeders disposed outward of the dispersion table, the plurality of conveying feeders being configured to further convey the article conveyed from the dispersion table, a detector configured to detect a loading status information of the article in each of the plurality of conveying feeders, and a controller configured to receive a detection result of the detector, wherein the controller is configured to: generate a vector information based on the loading status information detected by the detector and a position information of the plurality of conveying feeders with respect to a center of the dispersion table; and generate a biased center of the article on the dispersion table obtained based on the vector information as a biased center position information with respect to the center of the dispersion table.

According to the combination weighing apparatus, a controller generates a vector information based on a loading status information detected by a detector and a position information of a plurality of conveying feeders with respect to a center of a dispersion table, and generates a biased center of an article on the dispersion table obtained based on the vector information as a biased center position information with respect to the center of the dispersion table. The position information of the plurality of conveying feeders with respect to the center of the dispersion table may be preset. Thus, by simply detecting the loading status information of the article on the conveying feeder, information about the biased center of the article on the dispersion table may be obtained. Therefore, according to the combination weighing apparatus, the deviation degree of the articles supplied to the plurality of conveying feeders through the dispersion table may be easily estimated by simply detecting the loading status information of the articles on the conveying feeders.

The controller may be configured to adjust a position of the received center based on the biased center position information. In this case, the degree of bias of the article on the dispersion table can be automatically reduced.

A combination weighing apparatus according to another aspect of the present disclosure includes a dispersion table configured to convey an article supplied from an outside to an outer side, a plurality of conveying feeders linearly arranged along a predetermined direction and outside the dispersion table, the plurality of conveying feeders being configured to further convey the article conveyed from the dispersion table, a detector configured to detect a loading status information of the article in each of the plurality of conveying feeders, and a controller configured to receive a detection result of the detector, wherein the controller is configured to: generate a vector information based on the loading status information detected by the detector and a position information of the plurality of conveying feeders with respect to a center of the dispersion table; and generate a biased center of the article on the dispersion table obtained based on the vector information as a biased center position information with respect to the center of the dispersion table.

According to the combination weighing apparatus, a controller generates a vector information based on a loading status information detected by a detector and a position information of a plurality of conveying feeders with respect to a center of a dispersion table, and generates a biased center of an article on the dispersion table obtained based on the vector information as a biased center position information with respect to the center of the dispersion table. The position information of the plurality of conveying feeders with respect to the center of the dispersion table may be preset. Thus, by simply detecting the loading status information of the article on the conveying feeder, information about the biased center of the article on the dispersion table may be obtained. Therefore, according to the combination weighing apparatus, the deviation degree of the articles supplied to the plurality of conveying feeders through the dispersion table can be easily estimate by simply detecting the loading status information of the articles on the conveying feeders.

The combination weighing apparatus may further include a display portion configured to display the biased center position information overlaid on a schematic diagram of the dispersion table. In this case, the user of the combination weighing apparatus may visually check the deviation degree of the article on the dispersion table through the display portion. Therefore, the user can easily adjust the biased center of the article on the dispersion table.

The vector information may include a first vector information based on a loading status information detected from a part of the plurality of conveying feeders and a position information of the part of the plurality of conveying feeders with respect to the center of the dispersion table, and a second vector information based on a loading status information detected from another part of the plurality of conveying feeders and a position information of the another part of the plurality of conveying feeders with respect to the center of the dispersion table, and the biased center position information may include a first position information indicating a biased center of the article on the dispersion table obtained based on the first vector information and a second position information indicating a biased center of the article on the dispersion table obtained based on the second vector information. In this case, the degree of bias of the article on the dispersion table with respect to a part of the plurality of conveying feeders may also be checked.

The article may include a first article and a second article, the dispersion table may include a first dispersion part configured to convey the first article to the outer side, a second dispersion part configured to convey the second article to the outer side, and a partition wall configured to partition the first dispersion part and the second dispersion part, the first position information may indicate a biased center of the first article, and the second position information may indicate a biased center of the second article. In this case, even when a plurality of articles are weighed by a single combination weighing apparatus, information about the biased centers of each article on the dispersion table can be obtained.

Advantageous Effects of Invention

According to an aspect of the present disclosure, it is possible to provide a combination weighing apparatus capable of easily estimating a degree of bias of articles supplied to a plurality of conveying feeders through a dispersion table.

Figure 4:
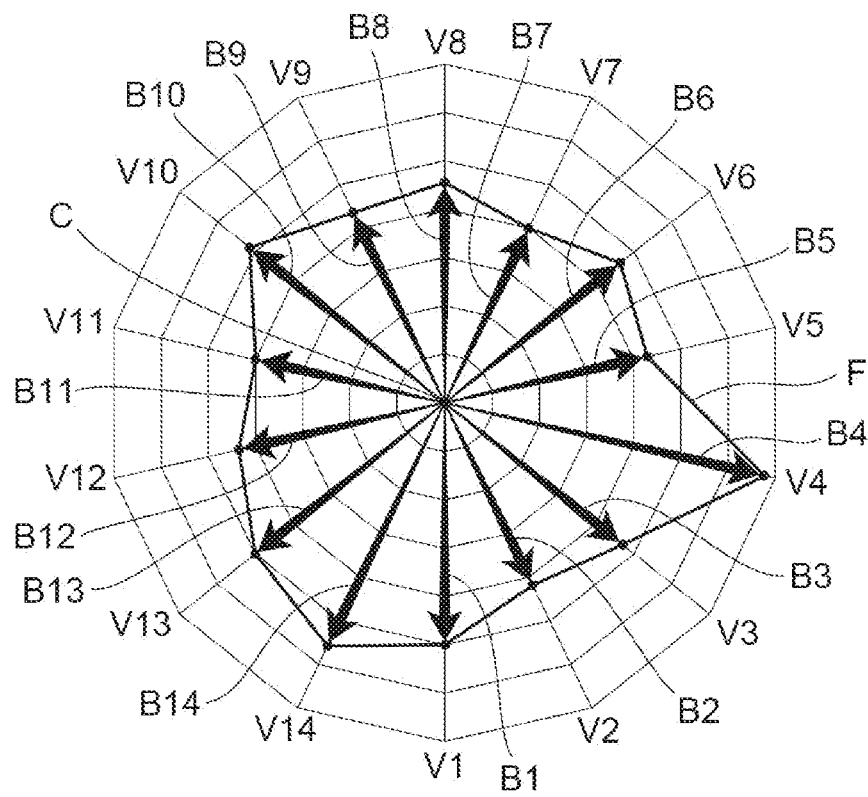
Figure 4:
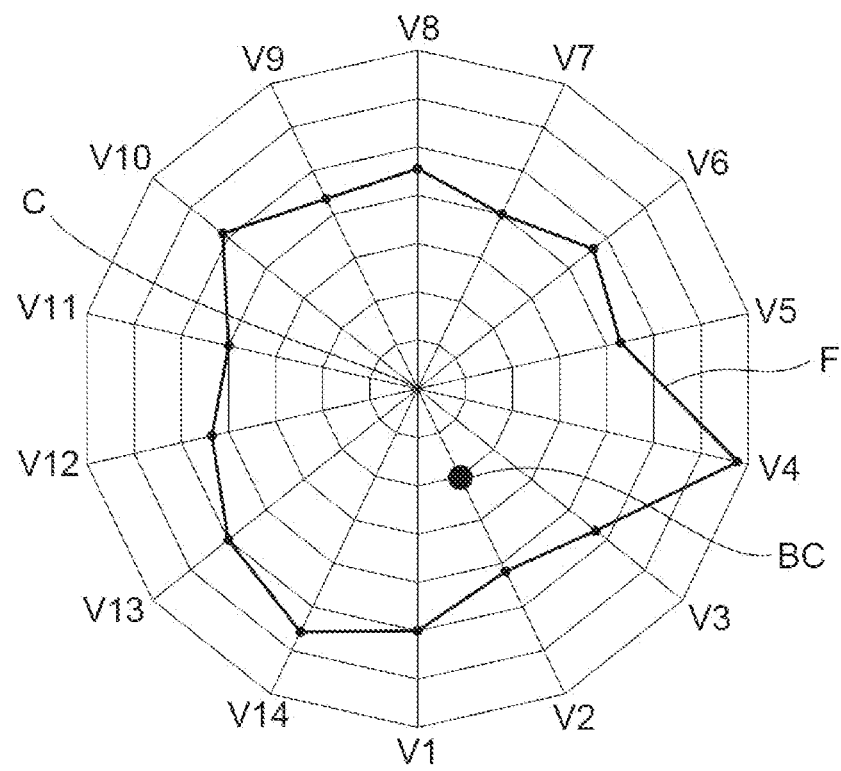

(a) of FIG. 4 illustrates a generated vector information, and (b) of FIG. 4 illustrates a biased center position information obtained from the vector information.

Figure 5:
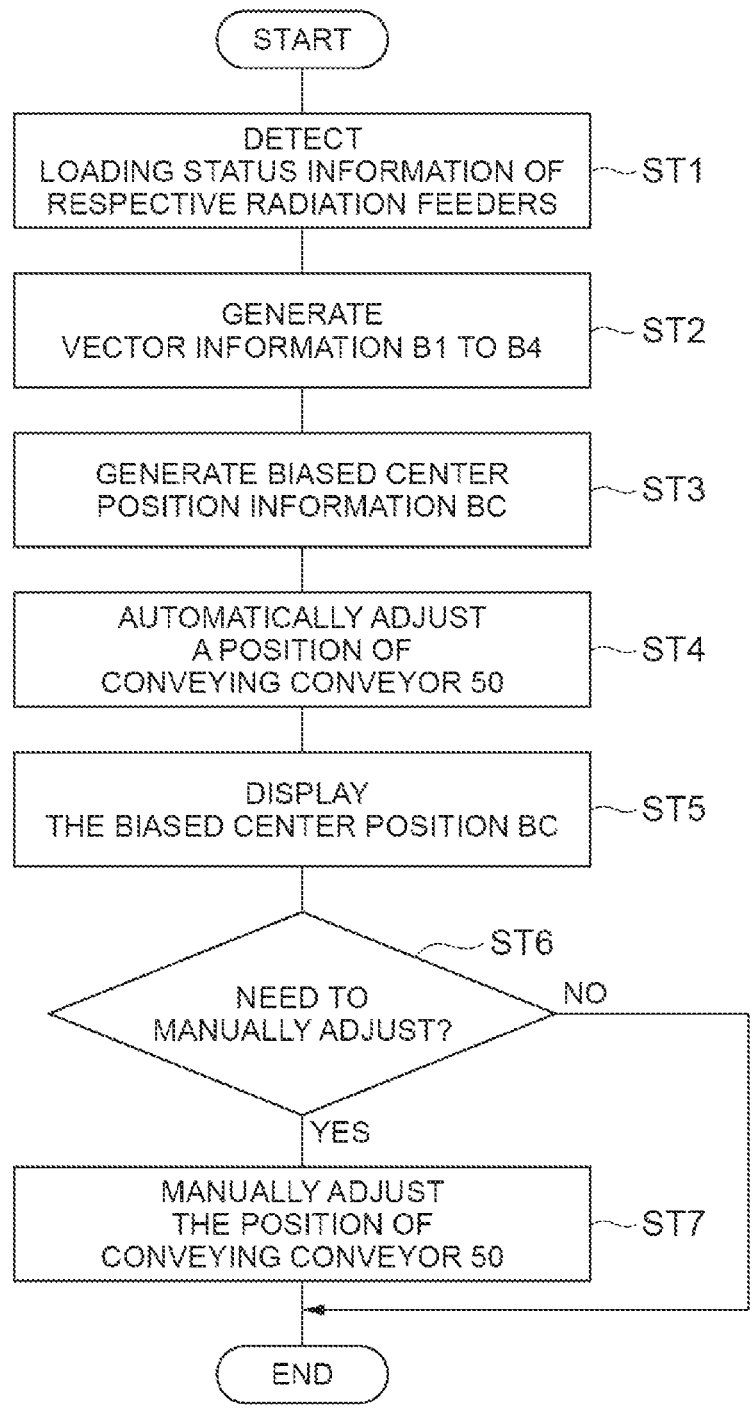

FIG. 5 is a flowchart illustrating an example of a method of adjusting a received center of an article.

Figure 6:
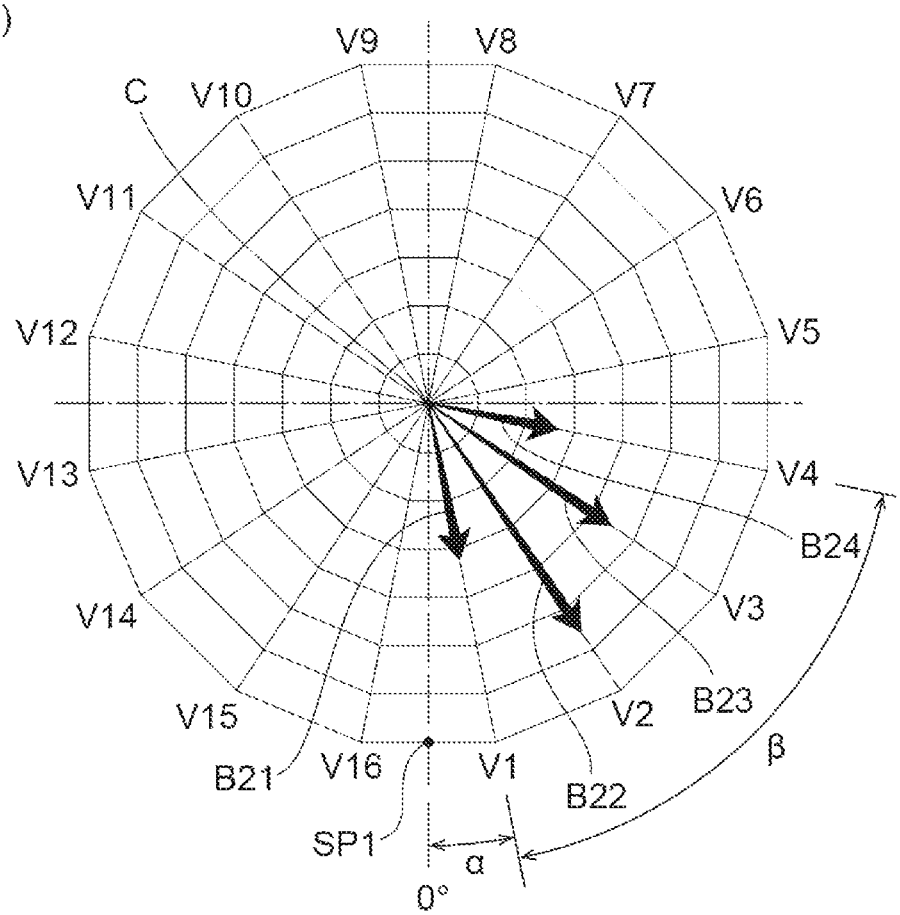
Figure 6:
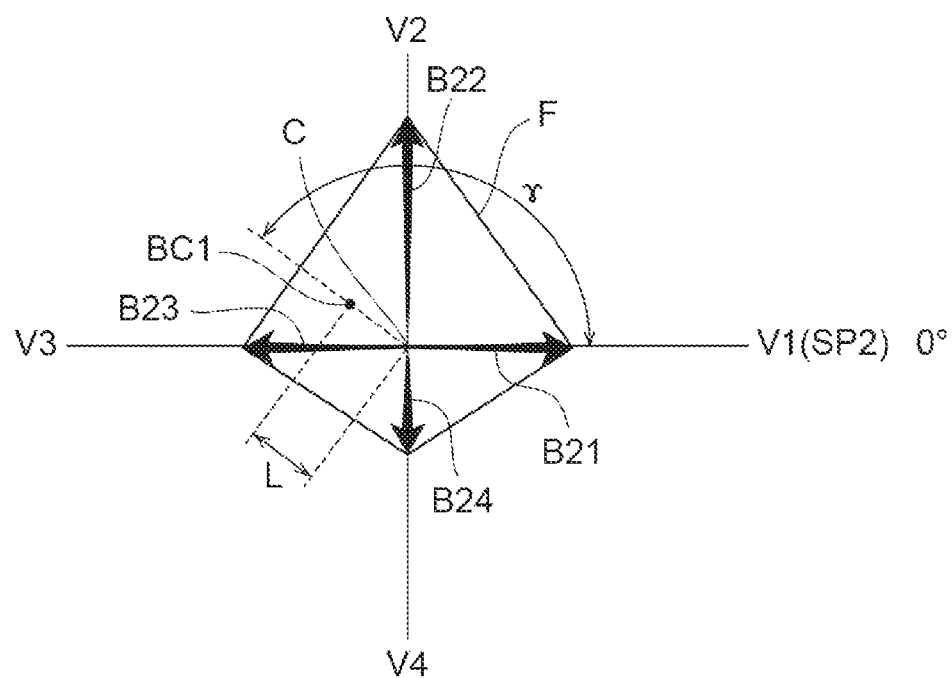

(a) of FIG. 6 is a diagram showing a radar chart applied to a combination weighing apparatus according to a first modification, and (b) of FIG. 6 is a diagram showing a radar chart reconstructed using a part of elements shown in (a) of FIG. 6.

Figure 7:
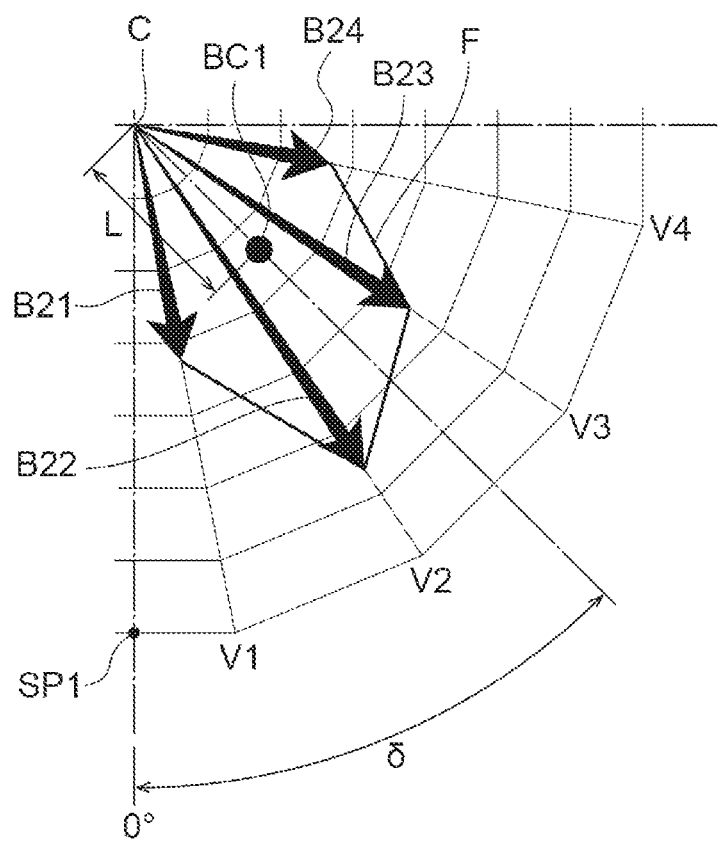

FIG. 7 is a diagram in which a biased center position information BC1 is overlaid on a part of the radar chart shown in (a) of FIG. 6.

Figure 8:
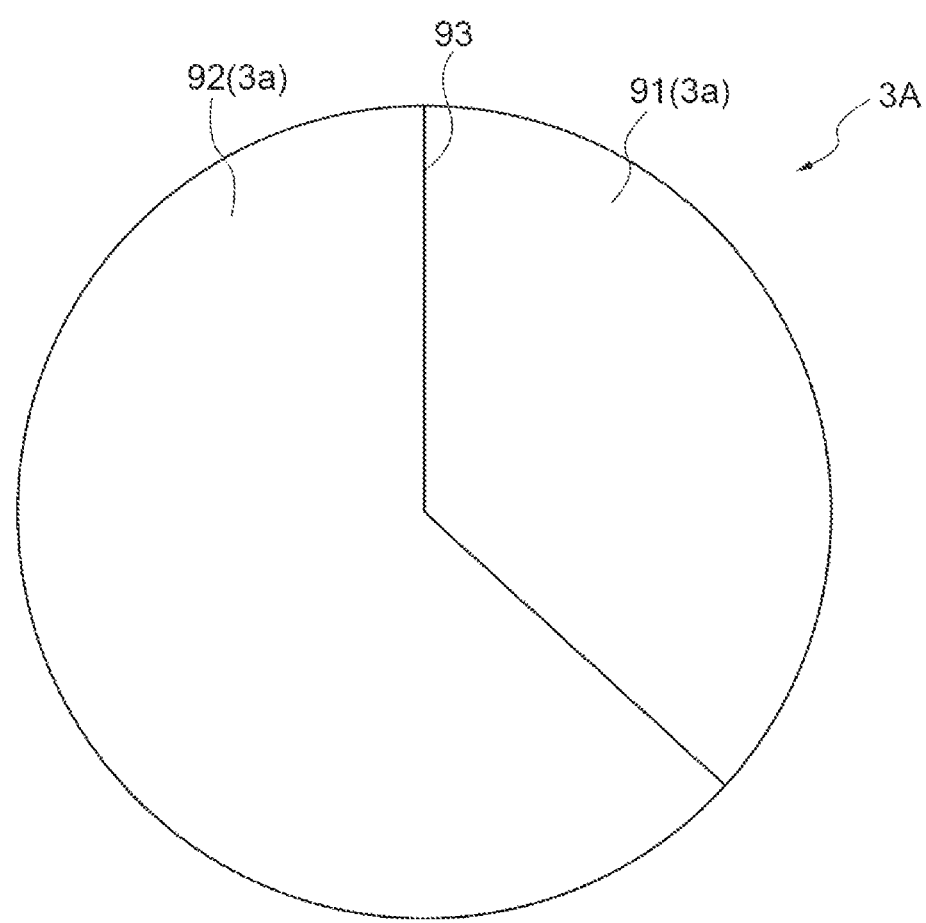

FIG. 8 is a plan view showing another example of the dispersion feeder.

Figure 9:
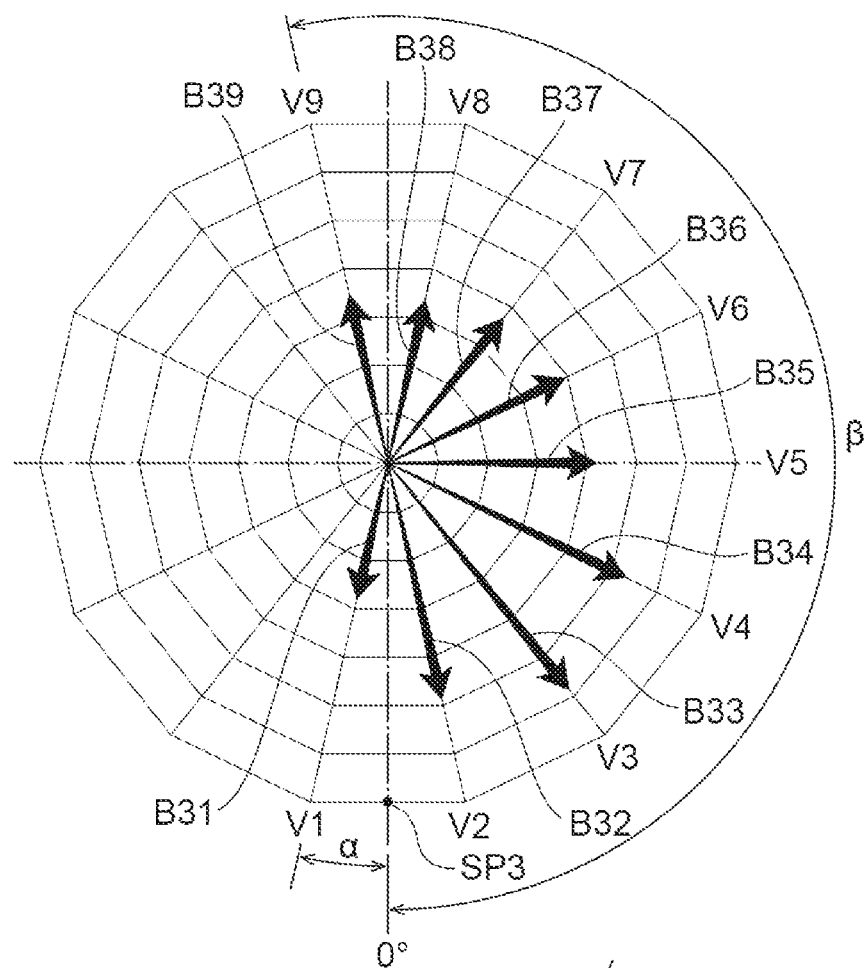
Figure 9:
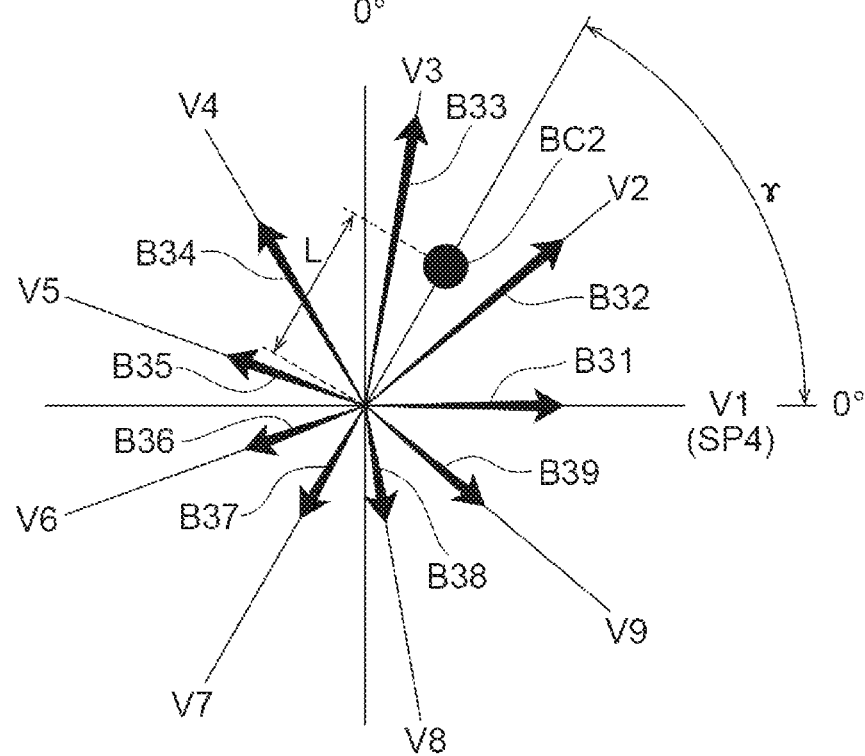

(a) of FIG. 9 is a diagram showing a radar chart applied to a combination weighing apparatus according to a second modification, and (b) of FIG. 9 is a diagram showing a radar chart reconstructed using elements shown in (a) of FIG. 9.

Figure 10:
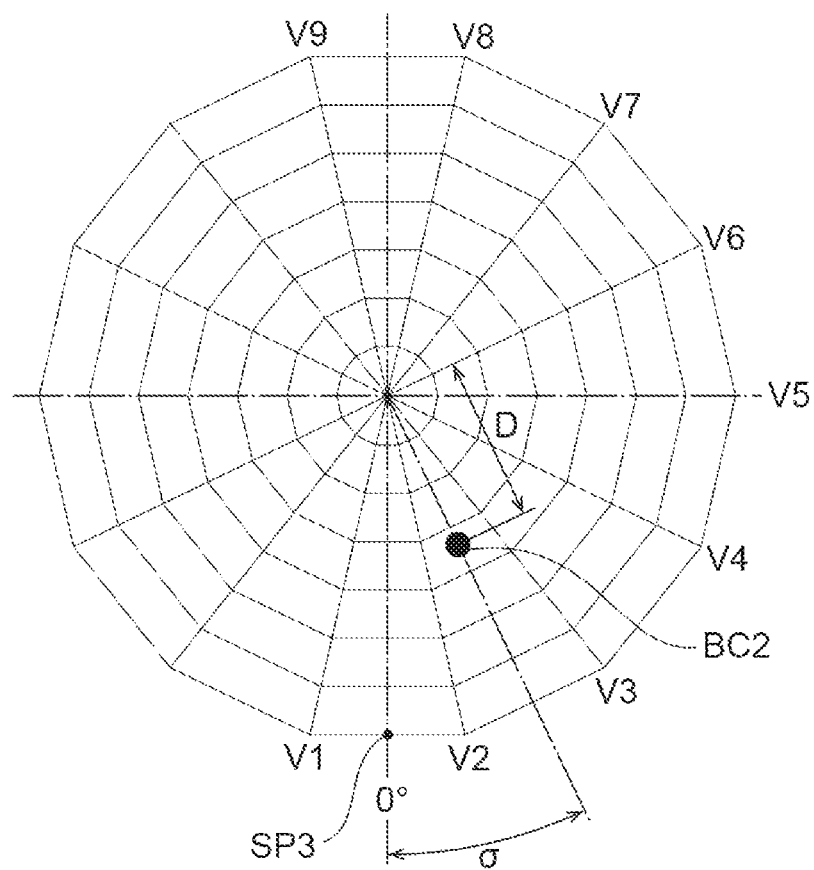

FIG. 10 is a diagram in which a biased center position information BC2 is overlaid on the radar chart shown in (a) of FIG. 9.

Figure 11:
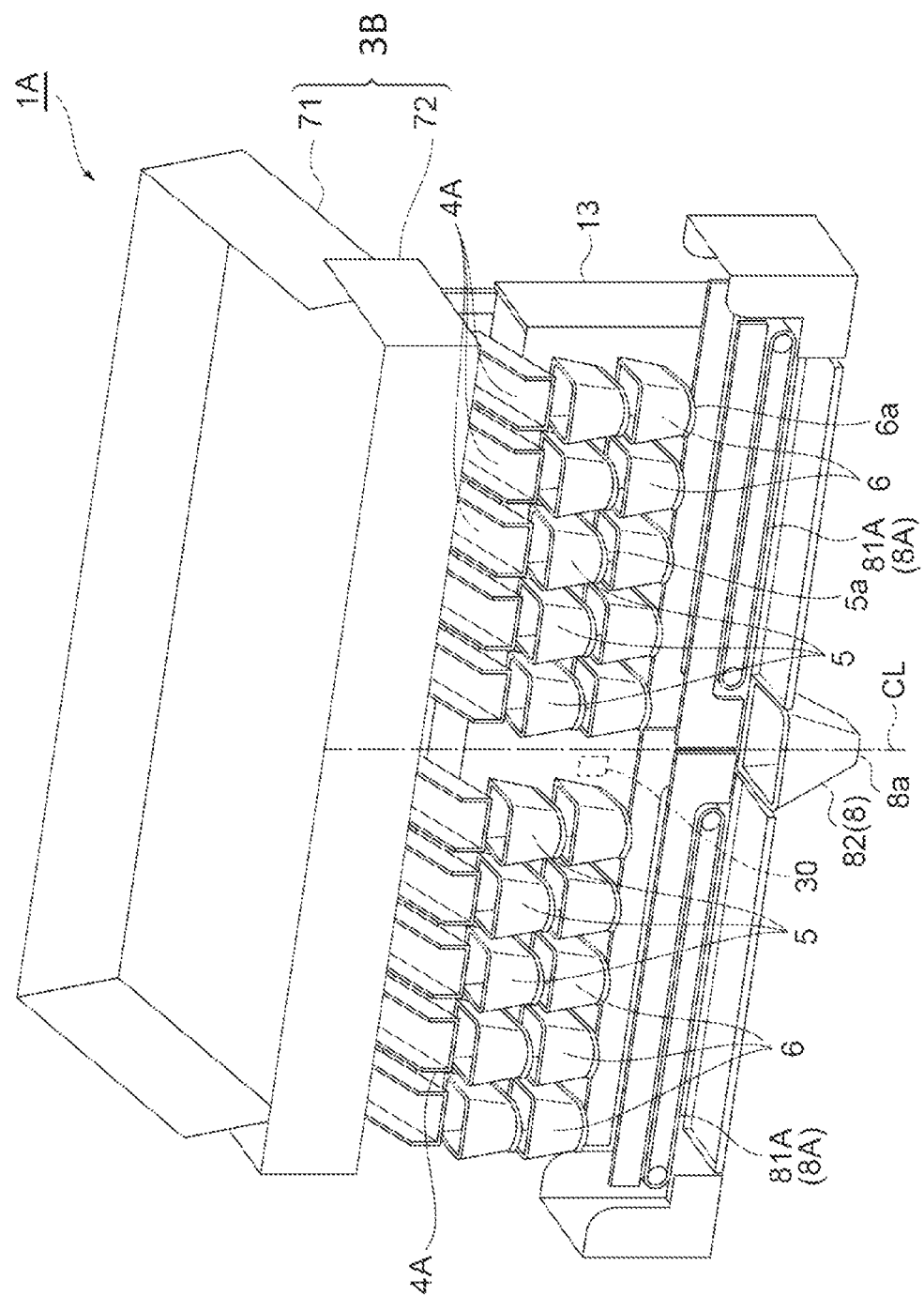

FIG. 11 is a schematic configuration view of a combination weighing apparatus according to another example of the second modification.

DESCRIPTION OF EMBODIMENTS

Hereinafter, an embodiment of the present disclosure will be described in detail with reference to the drawings. In the drawings, the same or corresponding portions are denoted by the same reference numerals, and redundant description will be omitted.

Figure 1:
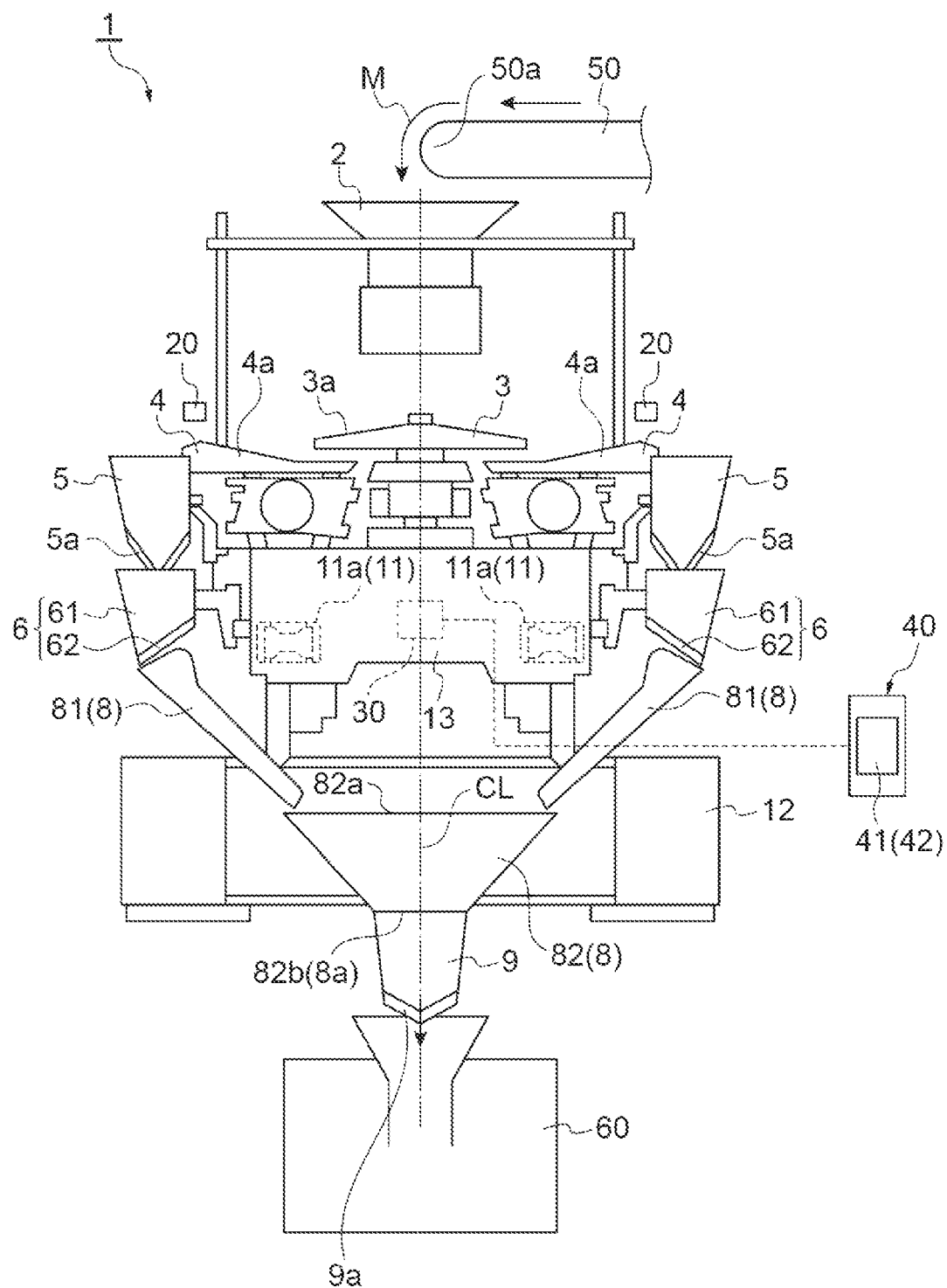
FIG. 1 is a schematic configuration view of a combination weighing apparatus according to an embodiment.

FIG. 1 is a schematic configuration view of a combination weighing apparatus according to the present embodiment. As shown in FIG. 1, the combination weighing apparatus 1 includes a charge chute 2, a dispersion feeder 3 (dispersion table), a plurality of radiation feeders 4 (conveying feeders), a plurality of pool hoppers 5, a plurality of weighing hoppers 6, a collecting chute 8, a timing hopper 9, a weighing unit 11, detectors 20, a controller 30, and a user interface 40. The combination weighing apparatus 1 weighs an article M (an article having a variation in unit mass, such as agricultural products, marine products, processed foods, and the like) supplied by the conveyance conveyor 50 to a target weighing value and supplies the article M to the bag forming and packaging machine 60. The bag forming and packaging machine 60 forms the film into a bag having a predetermined amount and bags the article M weighed and supplied by the combination weighing apparatus 1.

The charge chute 2 is disposed below a conveying end 50a of the conveyance conveyor 50. The charge chute 2 receives the article M dropped from the conveying end 50a of the conveyance conveyor 50 and discharges the article M downward.

The dispersion feeder 3 is a member disposed below the charge chute 2. The dispersion feeder 3 has a conical conveying surface 3a that widens downward toward an end. For this reason, a center of the conveying surface 3a becomes the most protruded top portion, and the top portion overlaps the center line CL. The dispersion feeder 3 conveys the article M supplied from the conveyance conveyor 50 via the charge chute 2 from a received center toward an outer side. For example, the dispersion feeder 3 vibrates the conveying surface 3a to uniformly convey the article M discharged from the charge chute 2 to the received center of the conveying surface 3a toward an outer edge of the conveying surface 3a. The received center of the conveying surface 3a is a center of a portion that receives the article M supplied from the conveyance conveyor 50 on the conveying surface 3a, and can be changed as appropriate by a movement of the conveyance conveyor 50 or the like. The position, a vibration intensity, and the like of the dispersion feeder 3 may be automatically controlled or manually controlled.

Figure 2:
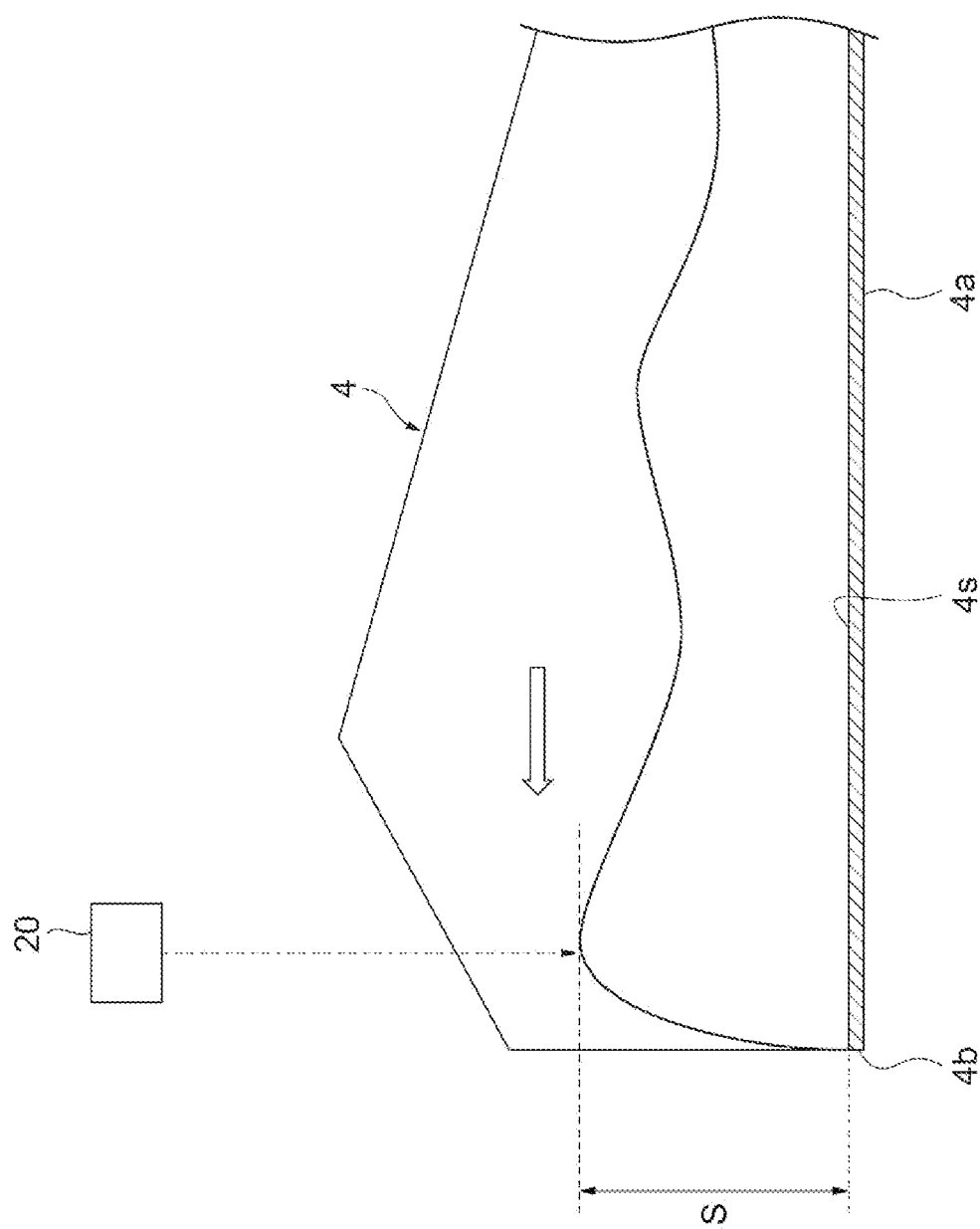
FIG. 2 is a view showing a vicinity of a discharge end of a radiation feeder.

The plurality of radiation feeders 4 are members that further convey the article M conveyed from the dispersion feeder 3, and are disposed outside the dispersion feeder 3. The plurality of radiation feeders 4 are radially arranged along the outer edge of the conveying surface 3a of the dispersion feeder 3, and surround the dispersion feeder 3 in a plan view. FIG. 2 is a view showing the vicinity of the discharge end of the radiation feeder. As shown in FIG. 2, the radiation feeder 4 has a trough 4a extending outward from below the outer edge of the conveying surface 3a. The radiation feeder 4 vibrates the trough 4a and conveys the article M discharged from the outer edge of the conveying surface 3a toward the distal end 4b of the trough 4a. In the present embodiment, a total of fourteen radiation feeders 4 are arranged counterclockwise outside the dispersion feeder 3, and are arranged at equal intervals along the circumferential direction of the dispersion feeder 3.

The plurality of pool hoppers 5 are arranged so as to surround a center line CL parallel to the vertical direction. Each of the pool hoppers 5 is disposed below the distal end 4b of the trough 4a of each of the radiation feeders 4. Each of the pool hoppers 5 has a gate 5a allowed to be opened and closed. The gate 5a is located at a bottom of the pool hopper 5. Each of the pool hoppers 5 temporarily stores the article M discharged from the distal end of the corresponding trough 5a by closing the gate 4a. Further, each of the pool hoppers 5 discharges the temporarily stored article M downward by opening the gate 5a.

The weighing hoppers 6 are arranged so as to surround the center line CL. Each of the weighing hoppers 6 is located below the gate 5a of each of the pool hoppers 5. Each of the weighing hoppers 6 has a main body 6a and a gate 6b allowed to be opened and closed. The gate 6b is provided in the main body 6a. Each of the weighing hoppers 6 temporarily stores the article M discharged from the corresponding pool hopper 5 in the main body 6a by closing the gate 6b. Further, each of the weighing hoppers 6 discharges the article M temporarily stored in the main body 6a downward by opening the gate 6b.

The collecting chute 8 collects the articles M discharged from each of the weighing hoppers 6 into a discharge port 8a. The discharge port 8a is located below the weighing hoppers 6 and above the center line CL. The collecting chute 8 includes an upper chute part (chute portion) 81 and a lower chute part 82. The upper chute part 81 receives the article M discharged from each of the weighing hoppers 6 and slides the article M toward the discharge port 8a (i.e., toward and below a side of the center line CL). The lower chute part 82 is a truncated cone-shaped cylindrical body tapered downward, and has an upper opening 82a and a lower opening 82b. The lower chute part 82 discharges the article M downward from the discharge port 8a, with the lower opening 82b as the discharge port 8a.

The timing hopper 9 is disposed below the discharge port 8a. The timing hopper 9 has a gate 9a allowed to be opened and closed with respect to the bottom thereof. The timing hopper 9 temporarily stores the article M discharged from the collecting chute 8 by closing the gate 9a. Further, the timing hopper 9 discharges the temporarily stored article M to the bag forming and packaging machine 60 by opening the gate 9a.

The weighing unit 11 is disposed in a case 13 supported by a frame 12. The weighing unit 11 has a plurality of load cells 11a. Each of the load cells 11a supports a corresponding weighing hopper 6. The weighing unit 11 weighs a weighing value corresponding to the mass of the article M when the article M is temporarily stored in each of the weighing hoppers 6.

The detectors 20 are devices each of that detects a loading status information of the article M in each of the plurality of radiation feeders 4. The loading status information of the article M is information indicating the state of the article M loaded on the radiation feeder 4, and is, for example, the amount, thickness, residence time, amount transported within a predetermined period, or the like of the article M to be loaded. The detectors 20 are positioned above the radiation feeder 4, for example by being attached to a support frame (not shown). In the present embodiment, the detector 20 is a distance measuring sensor that detects the distance between the detector 20 and the article M on the radiation feeder 4. For example, the detector 20 emits light toward the article M and receives light reflected from the article M, thereby obtaining a distance between the detector 20 and the article M. Based on the distance measurement result, the detector 20 acquires the layer thickness S of the article M. The layer thickness S is one of the loading status information, and is a distance between the bottom surface 4s of the radiation feeder 4 and the upper portion of the article M in the vicinity of the discharge end of the radiation feeder 4. The vicinity of the discharge end is a position retracted by a predetermined distance from a distal end 4b of the radiation feeder 4 in the transport direction, and is, for example, a position retracted by about 30 mm to 50 mm from the distal end 4b of the radiation feeder 4. In the present embodiment, the detector 20 has information about the trough 4a of the radiation feeder 4 and information about the vicinity of the discharge end of the radiation feeder 4. The detector 20 can detect the loading amount of the article M by the radiation feeder 4 based on these pieces of information and the detected layer thickness S. The loading amount of the article M is one of the loading status information. Therefore, in the present embodiment, the loading status information of the article M detected by the detector 20 includes at least one of the layer thickness S and the loading amount of the article M.

The controller 30 is disposed in the case 13. The controller 30 includes a central processing unit (CPU), a read only memory (ROM), a random access memory (RAM), and the like. The controller 30 controls the operation of each part of the combination weighing apparatus 1, such as a conveying operation of the dispersion feeder 3 and the radiation feeder 4, an opening/closing operation of the gate 5a of each of the pool hoppers 5, the opening/closing operation of the gate 6b of each of the weighing hoppers 6, and the opening/closing operation of the gate 9a of the timing hopper 9. The controller 30 receives the loading status information of the detector 20. The controller 30 is communicatively connected to the conveyance conveyor 50 and the bag forming and packaging machine 60. Therefore, the controller 30 can change, for example, the position of the conveyance conveyor 50. For example, the controller 30 can adjust the position of the received center of the article M on the dispersion feeder 3 by performing control to change the position of the conveyance conveyor 50.

The controller 30 stores the weighing value weighed by the weighing unit 11 and the weighing hopper 6 storing the article M corresponding to the weighing value in association with each other. The controller 30 selects a combination of weighing values from weighing values weighed by the weighing unit 11 and associated with the respective weighing hoppers 6 so that a total value becomes a target weighing value. More specifically, the controller 30 selects a combination of weighing values from the weighing values output by the weighing unit 11 so that a total value falls within a predetermined range whose lower limit corresponds to the target weighing value. That is, the controller 30 causes the weighing hopper(s) 6 associated with the combination to discharge the article M.

The user interface 40 is a device for the user to confirm the state of the combination weighing apparatus 1 and for the user to input information to the controller 30. In the present embodiment, the user interface 40 is provided at a position spaced apart from the frame 12 and the case 13, but is not limited thereto. The user interface 40 includes a display portion 41 and an interface 42. The display portion 41 displays information output from the controller 30. For example, the user can check the loading status information of the article M in each of the radiation feeders 4, a degree of bias of the article M supplied from the dispersion feeder 3 to the radiation feeder 4, and the like via the display portion 41. In the present embodiment, the interface 42 is a touch panel provided on the display portion 41, but is not limited thereto. The interface 42 may include a keyboard, a mouse, a ten key pad, a microphone, and the like independent of the display portion 41. The user interface 40 may include a speaker or the like that outputs sound.

The charge chute 2, the dispersion feeder 3, the radiation feeders 4, the pool hoppers 5, and the weighing hoppers 6 may be directly or indirectly supported by the case 13. The collecting chute 8 and the timing hopper 9 are directly or indirectly supported by the frame 12.

Figure 3:
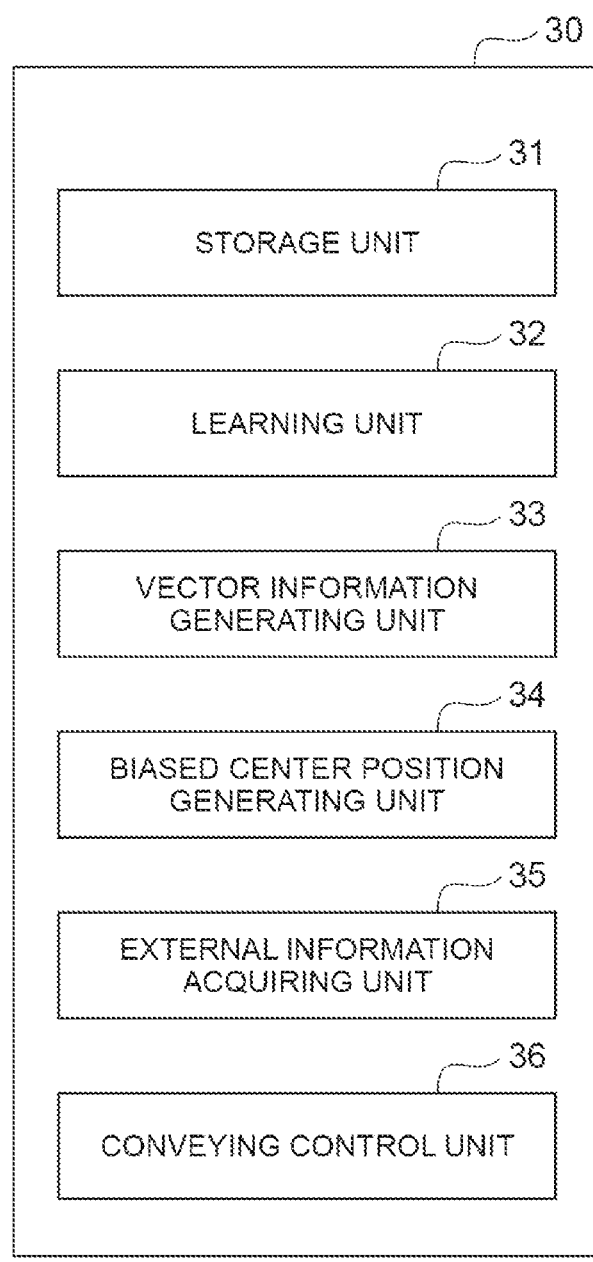
FIG. 3 is a diagram illustrating a functional configuration of a controller.

Next, the controller 30 will be described in more detail. FIG. 3 is a diagram illustrating a functional configuration of the controller. As shown in FIG. 3, the controller 30 includes a storage unit 31, a learning unit 32, a vector information generating unit 33, a biased center position generating unit 34, an external information acquiring unit 35, and a conveying control unit 36. The controller 30 includes a storage unit 31, a learning unit 32, a vector information generating unit 33, a biased center position generating unit 34, an external information acquiring unit 35, and a conveying control unit 36 as conceptual parts for executing various control processes. Such conceptual parts can be configured as software in which a program stored in the ROM is loaded on the RAM and executed by the CPU, for example.

The storage unit 31 stores, for example, the relationship among the layer thickness S of the article M on the radiation feeder 4, the target conveying amount W of the radiation feeder 4, the supplied power P of the radiation feeder 4, and the operation time t of the radiation feeder 4. The operation time is a duration during which the radiation feeder 4 is actually operating to convey the article M. Specifically, the following equation (1) is stored in the storage unit 31. The storage unit 31 stores the relationship for each of the plurality of radiation feeders 4. The storage unit 31 stores a derivation result of the following equation (1).

$$P = A \times W/S + B \quad (1)$$

The supplied power P is the amplitude of vibration (vibration intensity) of the radiation feeder 4. When the value of the supplied power P is small, the amplitude of the radiation feeder 4 becomes small. Therefore, the conveying amount of the article M supplied from the radiation feeder 4 to the weighing hopper 6 (pool hopper 5) is reduced. When the value of the supplied power P is large, the amplitude of the radiation feeder 4 becomes large. Therefore, the conveying amount A of the article supplied from the radiation feeder 4 to the weighing hopper 6 increases. The target conveying amount W corresponds to a target value of amount of the article M supplied from the radiation feeder 4 to the weighing hopper 6 via the pool hopper 5.

In the above equation (1), "A" and "B" are coefficients. The coefficient A and the coefficient B are parameters related to the operation of the transport unit. The coefficient A and the coefficient B are parameters that associate the relationship between the supplied power P and the value obtained based on the layer thickness S and the target conveying amount W of the article M. In the initial state of the combination weighing apparatus 1 (when the operation of the combination weighing apparatus 1 is started for the first time), the coefficient A and the coefficient B are given as empirically obtained value in accordance with the configuration of the combination weighing apparatus 1 as initial values (initial parameters), for example. Each of coefficient A and coefficient B is a value that can be changed according to the shape of the radiation feeder 4 and/or the type of article. The storage unit 31 stores, for example, the initial parameters and coefficients A and B that are different from the initial parameters and are calculated by the learning unit 32.

The learning unit 32 sequentially calculates the coefficient A and the coefficient B based on the relationship among the layer thickness S, the target conveying amount W, and the supplied power P continuously acquired from the past. In other words, the learning unit 32 calculates the coefficient A and the coefficient B by learning control.

To be more specific, the learning unit 32 generates, as the history information, the actual conveying amount W1 when the supplied power P is controlled in accordance with the layer thickness S so as to become the target conveying amount W on the basis of the above equation (1) as needed or regularly. The history information is stored in the storage unit 31. The learning unit 32 stores the supplied power P and a value obtained by dividing the conveying amount W1 by the layer thickness S (conveying amount W1/layer thickness S) in the storage unit 31 in association with each other.

The learning unit 32 calculates the coefficient A and the coefficient B based on the plurality of pieces of history information stored in the storage unit 31. In this case, the learning unit 32 calculates the coefficient A and the coefficient B on the assumption that the relationship represented by the above equation (1) is established with respect to the layer thickness S, the target conveying amount W, and the supplied power P. Specifically, the learning unit 32 derives new coefficients A and coefficients B, for example, every predetermined period by least squares method or the like based on the history information acquired so far. When the new coefficients A and B are derived, a weight (magnitude of influence when the new coefficients A and B are determined) can be set for each piece of history information. For example, information close to the current time has a high weight.

The learning unit 32 may calculate new coefficient A and coefficient B at the timing when the history information is updated. The coefficients A and B are used to determine the supplied power P at present or in the future. The numerical accuracy of the coefficient A and the coefficient B improves as the learning unit 32 acquires various operation time t, layer thickness S, and supplied power P in different combinations. The learning unit 32 calculates the supplied power P of each of the radiation feeders 4 using the calculated coefficients A and B and the above equation (1). The calculated supplied power P is transmitted to the conveying control unit 36.

The vector information generating unit 33 generates vector information based on the loading status information of the article M detected by the detectors 20 and position information of the plurality of radiation feeders 4 with respect to the center of the dispersion feeder 3. The vector information generating unit 33 detects loading status information of the article M in each of the plurality of radiation feeders 4 from the detectors 20. The vector information generating unit 33 acquires the position information stored in the storage unit 31 and set in advance. The vector information generating unit 33 transmits the generated vector information to the user interface 40. Accordingly, the display portion 41 included in the user interface 40 displays the generated vector information. The vector information generating unit 33 transmits the generated vector information to the conveying control unit 36.

(a) of FIG. 4 is a diagram illustrating generated vector information. (a) of FIG. 4 is a diagram of the dispersion feeder 3 including the center point C and the vertices V1 to V14. A center point C indicates the center of the dispersion feeder 3. Each of the vertices V1 to V14 indicates position information of the radiation feeders 4 with respect to the center of the dispersion feeder 3. In the present embodiment, the positional relationship between the center point C and the vertices V1 to V14 is the same as the positional relationship between the center of the dispersion feeder 3 and the plurality of radiation feeders 4 in a plan view, but the positional relationship is not limited thereto. For example, vertices V1 to V14 may be set in accordance with a number assigned to each of the plurality of radiation feeders 4. In this case, for example, the positional relationship between the center point C and the vertex V1 in the radar chart may be different from the positional relationship between the center of the dispersion feeder 3 and the actual position of the radiation feeder 4 to which the number 1 is assigned in a plan view. Thus, even when the plurality of radiation feeders 4 are not radially arranged, for example, the radar chart shown in (a) of FIG. 4 can be easily configured.

In (a) of FIG. 4, vector information B1 to B14 corresponding to vertex V1 to V14 are overlaid on the radar chart and displayed. Start points of the vector information B1 to B14 is a center point C. End points of the vector information B1 to B14 are located between the center point C and the vertices V1 to V14, respectively. The scalar quantity of vector information B1 to B14 is determined based on the loading status information of article M in the corresponding radiation feeder 4. In the present embodiment, the scalar quantities of the vector information B1 to B14 respectively correspond to the layer thicknesses S of the article M, but may be the loading amount of the article M. (a) of FIG. 4 shows a figure F obtained by connecting the end points of the vector information B1 to B14. The figure F is generated by, for example, the vector information generating unit 33.

The biased center position generating unit 34 generates a biased center of the article M on the dispersion feeder 3 obtained based on the vector information B1 to B14 as biased center position information with respect to the center of the dispersion feeder 3. The biased center position information is information indicating a degree of bias of the article M supplied from the dispersion feeder 3 to the plurality of radiation feeders 4, and corresponds to an end point of a vector obtained by combining the vector information B1 to B14. The biased center position generating unit 34 transmits the generated biased center position information to the user interface 40. Accordingly, the display portion 41 displays the generated biased center position information.

The biased center position generating unit 34 transmits the generated biased center position information to the conveying control unit 36.

(b) of FIG. 4 is a diagram illustrating biased center position information obtained from vector information B1 to B14. In (b) of FIG. 4, a radar chart are illustrated as similar to (a) of FIG. 4, and vector information B1 to B14 is omitted. Instead, in (b) of FIG. 4, biased center position information BC obtained based on vector information B1 to B14 is displayed. The farther the biased center position information BC is from the center point C, the more the article M is likely to be unevenly conveyed to a specific radiation feeder 4. On the other hand, as the biased center position information BC is closer to the center point C, the article M is likely to be evenly conveyed to each of the radiation feeders 4. In the display portion 41, biased center position information BC is displayed overlaid on the radar chart. Accordingly, the user of the combination weighing apparatus 1 can easily find the biased center position information BC through the display portion 41. Alternatively, as shown in (b) of FIG. 4, the biased center position information BC and the figure F overlaid on the radar chart may be simultaneously displayed on the display portion 41. Alternatively, the vector information B1 to B14 overlaid on the radar chart, the biased center position information BC, and the figure F may be simultaneously displayed on the display portion 41.

The external information acquiring unit 35 acquires information input from the outside of the combination weighing apparatus 1. The external information acquiring unit 35 acquires, for example, information input via the interface 42. The information input to the external information acquiring unit 35 includes control information for the configuration included in the combination weighing apparatus 1 and control information for an apparatus different from the combination weighing apparatus 1. The control information for the configuration included in the combination weighing apparatus 1 is, for example, control information such as the vibration intensity and vibration time of the dispersion feeder 3, control information such as the vibration intensity and vibration time of the radiation feeders 4, information on the target conveying amount, and the like. The control information for an apparatus different from the combination weighing apparatus 1 is, for example, control information such as the position and conveyance intensity of the conveyance conveyor 50. The external information acquiring unit 35 transmits the acquired information to the conveying control unit 36.

The conveying control unit 36 controls the position, conveying intensity, and the like of the conveying conveyor 50. For example, the conveying control unit 36 uses the received biased center position information BC to automatically control the position of the conveying end of the conveying conveyor 50, the conveying intensity, and the like. The position of the conveying end may be changed by the movement of the conveyance conveyor 50 itself, or may be changed in accordance with the operation of an actuator provided at the tip of the conveyance conveyor 50. In the present embodiment, the conveying control unit 36 controls the position of the conveying end of the conveyance conveyor 50 so that the biased center position information BC approaches the center point C, for example. Thus, the controller 30 can adjust the position of the received center of the dispersion feeder 3 based on the biased center position information BC. In addition, the conveying control unit 36 controls the position, conveying intensity, and the like of the conveyance conveyor 50 based on, for example, information transmitted from the external information acquiring unit 35.

In other words, the conveying control unit 36 can manually control the position and operation of the conveying conveyor 50. For example, when the automatic control of the conveyance conveyor 50 by the conveying control unit 36 is insufficient, the user of the combination weighing apparatus 1 can manually adjust the position or the like of the conveyance conveyor 50 as appropriate.

The conveying control unit 36 controls the supplied power P of the radiation feeders 4. The conveying control unit 36 controls the radiation feeders 4 with the supplied power P calculated from the layer thickness S of the article M and the actual conveying amount W1 by using the above equation (1). The conveying control unit 36 automatically controls the operation of the radiation feeders 4 by the calculated supplied power P. In addition, the conveying control unit 36 may control the operation of the radiation feeders 4 based on information input from the external information acquiring unit 35 via the user interface 40. That is, the conveying control unit 36 may manually control the operation of the radiation feeders 4.

Next, an example of a method for adjusting the received center of the article M in the combination weighing apparatus 1 will be described with reference to FIG. 5. FIG. 5 is a flowchart illustrating an example of a method of adjusting the received center of the article M. As illustrated in FIG. 5, the detectors 20 detect loading status information of the article M in each of the plurality of radiation feeders 4 (step ST1). Next, the vector information generating unit 33 generates vector information B1 to B14 based on the loading status information transmitted from the detectors 20 and the position information of each of the radiation feeders 4 stored in the storage unit 31 (step ST2). Next, the biased center position generating unit 34 generates biased center position information BC based on the vector information B1 to B14 (step ST3). Next, the conveying control unit 36 automatically adjusts the position of the conveying conveyor 50 based on the received biased center position information BC (step ST4). Thus, for example, the received center of the article M in the combination weighing apparatus 1 is automatically adjusted so that the biased center position information BC approaches the center point C. Next, the display portion 41 displays the biased center position information BC overlaid on the radar chart (step ST5). When the user who finds the display portion 41 needs to adjust the biased center position information BC (step ST6: YES), the user manually adjusts the position of the conveyance conveyor 50 through the interface 42 (step ST7). When the user who finds the display portion 41 does not need to adjust the biased center position information BC (step ST6: NO), the user does not perform manual adjustment of the conveyance conveyor 50.

According to the combination weighing apparatus 1 of the present embodiment described above, the vector information generating unit 33 of the controller 30 generates the vector information B1 to B14 based on the loading status information of the article M detected by the detectors 20 and the position information of the plurality of radiation feeders 4 with respect to the center of the dispersion feeder 3. The biased center position generating unit 34 of the controller 30 generates the biased center of the article M in the dispersion feeder 3 obtained based on the vector information B1 to B14 as the biased center position information BC with respect to the center of the dispersion feeder 3. The position information of the plurality of radiation feeders 4 with respect to the center of the dispersion feeder 3 can be set in advance. Thus, information about the biased center of the article M in the dispersion feeder 3 is obtained simply by detecting the loading status information of the article M on the radiation feeders 4. Therefore, according to the combination weighing apparatus 1, it is possible to easily estimate the degree of bias of the article M supplied to the plurality of radiation feeders 4 via the dispersion feeder 3 by simply detecting the loading status information of the article M on the radiation feeders 4. In addition, since it can be said that the reliability of the estimation is higher than the processing load, the estimation can be easily put to practical use.

In the present embodiment, the combination weighing apparatus 1 includes a display portion 41 that displays the biased center position information BC overlaid on a radar chart that is a schematic diagram of the dispersion feeder 3. Therefore, the user of the combination weighing apparatus 1 can visually confirm the degree of bias of the article M on the dispersion feeder 3 through the display portion 41. Therefore, the user can easily adjust the biased center of the article M in the dispersion feeder 3.

In the present embodiment, the controller 30 may adjust the position of the received center on the dispersion feeder 3 based on the biased center position information BC. In this case, the degree of bias of the article M on the dispersion feeder 3 can be automatically reduced.

Next, a combination weighing apparatus according to a first modification of the above-described embodiment will be described. In the first modification, as described below, biased center position information in a part of a plurality of radiation feeders included in the combination weighing apparatus can be generated.

(a) of FIG. 6 is a diagram showing a first chart applied to a combination weighing apparatus according to a modification of the first embodiment. (a) of FIG. 6 shows vertices V1 to V16 arranged at equal intervals along the circumferential direction. Therefore, the combination weighing apparatus according to the first modification includes a total of 16 radiation feeders. In (a) of FIG. 6, vector information VB21 to B24 (first vector information) corresponding to vertices B21 to B24 are shown, and vector information corresponding to vertices V5 to V16 is omitted. The vector information B21 to B24 are generated in the same manner as in the above embodiment. For example, the vector information B21 is generated by the vector information generating unit 33 based on the loading status information detected by the radiation feeder corresponding to the vertex V1 and the position information of the radiation feeder with respect to the center of the dispersion feeder.

In (a) of FIG. 6, an intermediate point between the vertex V1 and the vertex V16 is defined as a reference point SP1 (0°). In this case, for example, an angle formed by a line connecting the vertex V1 and the center point C and a line connecting the vertex V2 and the center point C is 22.5° obtained by dividing 360° by the number of vertices (that is, 16). An angle α formed by a line connecting the reference point SP1 and the center point C and the line connecting the vertex V1 and the center point C is 11.25°. An angle 1 formed by the line connecting the vertex V1 and the center point C and a line connecting the vertex V4 and the center point C is 67.5°.

(b) of FIG. 6 is a diagram showing a radar chart reconstructed using a part of the elements shown in (a) of FIG. 6. In (b) of FIG. 6, a radar chart reconstructed by vertices V1 to V4 and center point C is illustrated. The vertices V1 to V4 are arranged at equal intervals along the circumferential direction. In (b) of FIG. 6, the vertex V1 is defined as a reference point SP2 (0°). In this case, for example, an angle formed by the line connecting the vertex V1 and the center point C and the line connecting the vertex V2 and the center point C is 90° obtained by dividing 360° by 4. In (b) of FIG. 6, vector information B21 to B24, a figure F obtained by connecting end points of vector information B21 to B24, and biased center position information BC1 (first position information) obtained by combining vector information B21 to B24 str illustrated. The biased center position information BC1 is information indicating the degree of bias of article supplied to a part of radiation feeders corresponding to vertices V1 to V4 among the plurality of radiation feeders 4. From (b) of FIG. 6, the length L of the line connecting the biased center position information BC1 and the center point, and an angle γ formed by the line connecting the biased center position information BC1 and the center point C and the line connecting the vertex V1 and the center point C are acquired. In the first modification, for example, the biased center position generating unit 34 generates the biased center position information BC1 and calculates the length L and the angle γ.

FIG. 7 is a diagram in which the biased center position information BC1 is overlaid on a part of the radar chart shown in (a) of FIG. 6. In FIG. 7, the distance between the biased center position information BC1 and the center point C is equal to the length L shown in (b) of FIG. 6. An angle δ formed by a line connecting the biased center position information BC1 and the center point C and a line connecting the reference point SP1 and the center point C corresponds to a total value of the angle α and a value obtained by multiplying the angle β by the angle γ and dividing 360°. Specifically, the angle δ is calculated by the following equation (2). In the display portion 41 of the first modification, the biased center position information BC1 is displayed overlaid on the radar chart shown in (a) of FIG. 6. Therefore, the user of the combination weighing apparatus according to the first modification can visually check the biased center of the article in a part of the plurality of radiation feeders 4 through the display portion 41.

$$\Delta = \alpha + (\beta \times \gamma \div 360) \quad (2)$$

According to the first modification described above, the degree of bias of articles on the dispersion feeder with respect to a part of the plurality of radiation feeders can also be confirmed. Accordingly, the degree of bias of the article can be adjusted more precisely than in the above-described embodiment. In the first modification, in addition to vector information B21 to B24 in a part of the plurality of radiation feeders, vector information (second vector information) in another part of the plurality of radiation feeders may be generated. The second vector information is obtained based on loading status information detected by another part of the plurality of radiation feeders and position information of another part of the plurality of radiation feeders with respect to the center of the dispersion feeder. In addition, another biased second vector position information (second position information) indicating the biased center of the article on the dispersion feeder obtained based on the center information may be generated. In this case, for example, the storage unit 31 stores vector information including first and second vector information, and biased center position information including first and second position information. In such a first modification example, the degree of bias of the article according to a plurality of conditions can be appropriately used.

In the combination weighing apparatus according to the first modification, a plurality of articles may be supplied to the dispersion feeder in order to accommodate the plurality of articles in the bag at a time. In this case, for example, the dispersion feeder may have a configuration that prevents mixing of articles on its conveying surface. FIG. 8 is a plan view showing another example of the dispersion feeder. The dispersion feeder 3A illustrated in FIG. 8 includes a first dispersion part 91 that conveys first article outward from its received center, a second dispersion part 92 that conveys second article outward from the received center, and a partition wall 93 that partitions the first dispersion part 91 and the second dispersion part 92 from each other, the second article being different from the first article. The first dispersion part 91 is, for example, a part that supplies the first article to a part of the plurality of radiation feeders, and corresponds to a part of the conveying surface 3a. A received center of the first article overlaps with the first dispersion part 91. The second dispersion part 92 is, for example, a part that supplies the second article to another part of the plurality of radiation feeders, and corresponds to another part of the conveying surface 3a. A received center of the second article overlaps with the second dispersion part 92. The partition wall 93 is a member provided on the conveying surface 3a of the dispersion feeder 3A. By using such a dispersion feeder 3A, a plurality of articles can be weighed in a single combination weighing apparatus. Moreover, in the first modification, information about the biased centers of each article on the dispersion feeder 3A can be obtained. Therefore, the biased centers of each article can be easily adjusted by adjusting, for example, the position of the device that supplies the first article to the dispersion feeder 3A and the position of the device that supplies the second article to the dispersion feeder 3A.

Next, a combination weighing apparatus according to a second modification of the above-described embodiment will be described. The second modification is different from the above-described embodiment in that some of the radiation feeders are removed. The reason why the radiation feeder is removed includes, for example, downsizing of the combination weighing apparatus, a design change for combining with another apparatus, and the like.

(a) of FIG. 9 is a diagram illustrating a radar chart applied to a combination weighing apparatus according to a second modification. In (a) of FIG. 9, vertices V1 to V9 are shown. Therefore, the combination weighing apparatus according to the second modification includes nine radiation feeders in total. Each of intervals of the vertices V1 to V9 in the second modification along a circumferential direction is the same as each of the intervals of the vertices V1 to V9 in the first modification along the circumferential direction. The vertices V1 to V9 are located around the center point C, but are not located so as to surround the center point C. The positions of the vertices V1 to V9 with respect to the center point C correspond to the position of the radiation feeders with respect to the center of the dispersion feeder in a plan view. Therefore, in the second modification, the plurality of radiation feeders do not surround the dispersion feeder in a plan view.

In (a) of FIG. 9, vector information B31 to B39 corresponding to the vertices V1 to V9 are shown. The vector information B31 to B39 is generated in the same manner as in the above embodiment. In (a) of FIG. 9, an intermediate point between the vertex V1 and the vertex V2 is defined as a reference point SP3 (0°). As described above, the interval of respective vertices in the second modification is equal to the interval of respective vertices in the first modification. Therefore, for example, an angle formed by a line connecting the reference point SP3 and the center point C and a line connecting the vertex V1 and the center point C is −11.25°. An angle β formed by the line connecting the reference point SP3 and the center point C and a line connecting the vertex V9 and the center point C is 191.25°.

(b) of FIG. 9 is a diagram showing a radar chart reconstructed using the elements shown in (a) of FIG. 9. In (b) of FIG. 9, a radar chart in which the vertices V1 to V9 are rearranged so as to surround the center point C is illustrated. In (b) of FIG. 9, the vertices V1 to V9 are arranged at equal intervals along the circumferential direction. In (b) of FIG. 9, the vertex V1 is defined as a reference point SP4 (0°). In this case, for example, an angle formed by a line connecting the vertex V1 and the center point C and a line connecting the vertex V2 and the center point C is 40° obtained by dividing 360° by 9. In (b) of FIG. 9, vector information B31 to B39, figure F obtained by connecting the end points of vector information B31 to B39, and biased center position information BC2 obtained by synthesizing vector information B31 to 39 are illustrated. The biased center position information BC2 is information indicating the degree of bias of articles supplied to the radiation feeders corresponding to the vertices V1 to V9. From (b) of FIG. 9, a length L of the line connecting the biased center position information BC2 and the center point C, and an angle γ formed by the line connecting the biased center position information BC2 and the center point C and the line connecting the reference point SP4 and the center point C are acquired.

FIG. 10 is a diagram in which the biased center position information BC2 is overlaid on the radar chart shown in (a) of FIG. 9. In FIG. 10, the distance D between the biased center position information BC2 and the center point C corresponds to the length L shown in (b) of FIG. 9. An angle δ formed by a line connecting the biased center position information BC2 and the center point C and a line connecting the reference point SP3 and the center point C is calculated in the same manner as in the first modification described above.

Also in the second modification described above, the same operation and effect as those of the embodiment described above are exhibited. Therefore, even if the radiation feeder does not surround the dispersion feeder, it is possible to easily estimate the degree of bias of the articles supplied to the plurality of radiation feeders via the dispersion feeder. FIG. 11 is a schematic configuration view of a combination weighing apparatus according to another example of the second modification. The combination weighing apparatus 1A shown in FIG. 11 includes a dispersion feeder 3B, a plurality of radiation feeder 4A, a plurality of pool hoppers 5, a plurality of weighing hoppers 6, a collecting chute 8A, and a controller 30. In FIG. 11, detectors are omitted.

The dispersion feeder 3B includes a submission portion 71 having a rectangular box shape opened vertically upward and frontward, and a discharge portion 72 having a rectangular box shape opened vertically upward and rearward. The center of the dispersion feeder 3B overlaps the center line CL. The plurality of radiation feeders 4A are located on the outer side (lower side) of the discharge portion 72, and are linearly arranged along the predetermined direction. In FIG. 11, a conveying surface of the plurality of radiation feeders 4A is an inclined surface, but is not limited thereto. Loading status information of the article on the radiation feeder 4A is detected by detectors (not shown). The plurality of pool hoppers 5 and the plurality of weighing hoppers 6 are linearly arranged along a predetermined direction similarly to the radiation feeder 4A, respectively. The collecting chute 8A has an upper chute part 81A consisting of a conveyor located below the weighing hopper 6 and a lower chute part 82.

Even when the radiation feeders 4A are linearly arranged along the predetermined direction as in the combination weighing apparatus 4A, the controller 30 may generate biased center position information in the above-described manner. Therefore, even when the combination weighing apparatus 1A is used, the same operation and effect as those of the above-described embodiment and the like can be exhibited. That is, even in the combination weighing apparatus 1A, the loading status information of the article on the radiation feeder 4A may be simply detected to easily estimate the degree of bias of the article supplied to the plurality of radiation feeder 4A through the dispersion feeder 3B.

Although an embodiment of the present disclosure has been described above, the present disclosure is not limited to the above-described embodiment and the above-described modifications. For example, the first modification and the second modification may be appropriately combined. The plurality of hoppers are not limited to being annularly arranged like the plurality of weighing hoppers described above, and may be arranged in a matrix form. The combination weighing apparatus may include a plurality of booster hoppers.

Although the combination weighing apparatus includes the detector in the above-described embodiment and the above-described modifications, not limited thereto. For example, the detectors may be an external device different from the combination weighing apparatus. In this case, the combination weighing apparatus may acquire loading status information of the radiation feeders from the external apparatus. In the above-described embodiment and modified example, the detector is a distance measuring sensor, but is not limited thereto. For example, the detector may be an imaging device such as a 3D camera that detects loading status information of the article on the radiation feeder. That is, the detector may be a device capable of acquiring at least one of information regarding the layer thickness of the article on the radiation feeder and information regarding the load amount of the article on the radiation feeder. Even when the imaging apparatus is used, the vector information generating unit and the biased center position generating unit are used, and thus it is possible to easily estimate the degree of bias of the articles supplied to the plurality of radiation feeders via the dispersion feeder without performing complicated image processing. The detector may not detect the loading amount of articles on the radiation feeder. The detector may be a device that detects information for calculating the load amount of articles on the radiation feeder. For example, the detector may acquire only information about the layer thickness of the article on the radiation feeder, and the controller may calculate the load amount of the article on the radiation feeder based on the information received from the detector. In this case, it is interpreted that at least a part of the controller is included in the detector.

In the above-described embodiment and modifications, the conveyance controller adjusts the received center of the article on the dispersion feeder by controlling the conveyance conveyor, but is not limited thereto. For example, the controller may adjust the received center position by controlling the position of the dispersion feeder, the vibration intensity, and the like. Alternatively, the controller may adjust the received center of the article on the dispersion feeder by adjusting the position of the charge chute. The position of the dispersion feeder, the position of the charge chute, and the like may be automatically adjusted or manually adjusted.

In the above-described embodiment and the above-described modifications, the user interface includes the display portion, but is not limited thereto. For example, the combination weighing apparatus may not have the display portion when manual adjustment such as the conveyance conveyor by the user is not performed. Alternatively, the display portion may not display the biased center position information. In these cases, since the user of the combination weighing apparatus does not know the biased center position information, the display step of the biased center position information, the manual adjustment step of the dispersion feeder, and the like shown in the above embodiment are omitted.

In the above embodiment and the above modifications, the combination weighing apparatus includes the user interface, but is not limited thereto. For example, the device corresponding to the user interface may be a device different from the combination weighing apparatus and may be an electronic device having an application for controlling the combination weighing apparatus.

In the embodiment and the modification examples, the combination weighing apparatus automatically controls the position or the like of the convection conveyor by using the biased center position information, but the automatic control may not be performed. In this case, the automatic adjustment step of the conveyance conveyor shown in the above embodiment is omitted. When the position or the like of the conveyance conveyor is automatically controlled, the biased center position information does not need to be close to the center point. In other words, in a case where the position of the conveyance conveyor or the like is automatically controlled, the biased center position information may be brought close to a position regarded as the most appropriate.

REFERENCE SIGNS LIST

1: combination weighing apparatus
3: dispersion feeder (dispersion table)
4: radiation feeder (conveying feeder)
6: weighing hopper (hopper)
11: weighing unit
20: detector
30: controller
31: storage unit
33: vector information generating unit
34: biased center position generating unit
35: external information acquiring unit
36: transport controller
40: user interface
41: display portion
42: interface
B1 to B14, B21 to B24, B31 to B39: vector information
BC, BC1, BC2: biased center position information.

The invention claimed is:

1. A combination weighing apparatus comprising:
a dispersion table configured to convey an article supplied from a received center to an outer side, the article being supplied from an outside;
a plurality of conveying feeders disposed outward of the dispersion table, the plurality of conveying feeders being configured to further convey the article conveyed from the dispersion table;
a detector configured to detect a loading status information of the article in each of the plurality of conveying feeders; and
a controller configured to receive a detection result of the detector,
wherein the controller is configured to:
generate a vector information based on the loading status information detected by the detector and a position information of the plurality of conveying feeders with respect to a center of the dispersion table; and
generate a biased center of the article on the dispersion table obtained based on the vector information as a biased center position information with respect to the center of the dispersion table,
wherein the vector information includes:
a first vector information based on a loading status information of the article detected by a part of the plurality of conveying feeders and a position information of the part of the plurality of conveying feeders with respect to the center of the dispersion table; and
a second vector information based on a loading status information of the article detected by another part of the plurality of conveying feeders and a position information of the another part of the plurality of conveying feeders with respect to the center of the dispersion table.

2. The combination weighing apparatus according to claim 1,
wherein the controller is configured to adjust a position of the received center based on the biased center position information.

3. A combination weighing apparatus comprising:
a dispersion table configured to convey an article supplied from an outside to an outer side;
a plurality of conveying feeders linearly arranged along a predetermined direction and outside the dispersion table, the plurality of conveying feeders being configured to further convey the article conveyed from the dispersion table;
a detector configured to detect a loading status information of the article in each of the plurality of conveying feeders; and
a controller configured to receive a detection result of the detector,
wherein the controller is configured to:
generate a vector information based on the loading status information detected by the detector and a position information of the plurality of conveying feeders with respect to a center of the dispersion table; and
generate a biased center of the article on the dispersion table obtained based on the vector information as a biased center position information with respect to the center of the dispersion table,
wherein the vector information includes:
a first vector information based on a loading status information of the article detected by a part of the plurality of conveying feeders and a position information of the part of the plurality of conveying feeders with respect to the center of the dispersion table; and
a second vector information based on a loading status information of the article detected by another part of the plurality of conveying feeders and a position information of the another part of the plurality of conveying feeders with respect to the center of the dispersion table.

4. The combination weighing apparatus according to claim 1, further comprising a display portion configured to display the biased center position information overlaid on a schematic diagram of the dispersion table.

5. The combination weighing apparatus according to claim 1,
- wherein the biased center position information includes a first position information indicating a biased center of the article on the dispersion table obtained based on the first vector information, and a second position information indicating a biased center of the article on the dispersion table obtained based on the second vector information.

6. The combination weighing apparatus according to claim 5,
- wherein the article includes a first article and a second article,
- wherein the dispersion table includes a first dispersion part configured to convey the first article to the outer side, a second dispersion part configured to convey the second article to the outer side, and a partition wall configured to partition the first dispersion part and the second dispersion part,
- wherein the first position information indicates a biased center of the first article, and
- wherein the second position information indicates a biased center of the second article.

7. The combination weighing apparatus according to claim 3, further comprising a display portion configured to display the biased center position information overlaid on a schematic diagram of the dispersion table.

8. The combination weighing apparatus according to claim 3,
- wherein the biased center position information includes a first position information indicating a biased center of the article on the dispersion table obtained based on the first vector information, and a second position information indicating a biased center of the article on the dispersion table obtained based on the second vector information.

9. The combination weighing apparatus according to claim 8,
- wherein the article includes a first article and a second article,
- wherein the dispersion table includes a first dispersion part configured to convey the first article to the outer side, a second dispersion part configured to convey the second article to the outer side, and a partition wall configured to partition the first dispersion part and the second dispersion part,
- wherein the first position information indicates a biased center of the first article, and
- wherein the second position information indicates a biased center of the second article.

* * * * *